United States Patent
Shen

(10) Patent No.: US 6,564,826 B2
(45) Date of Patent: May 20, 2003

(54) FLOW REGULATOR FOR WATER PUMP

(76) Inventor: Der-Fan Shen, 5F, No. 40, Fentzu Wei Chieh, Shan-Chung City, Taipei Hsien (TW)

(*) Notice: Subject to any disclaimer, the term of this patent is extended or adjusted under 35 U.S.C. 154(b) by 1 day.

(21) Appl. No.: 09/912,464

(22) Filed: Jul. 24, 2001

(65) Prior Publication Data

US 2003/0019525 A1 Jan. 30, 2003

(51) Int. Cl.[7] .............................................. G05D 16/10
(52) U.S. Cl. .......................... 137/505.18; 137/505.29; 137/565.13; 417/295
(58) Field of Search .................... 137/494, 565.13, 137/505.18, 492.5, 505.29; 417/295; 251/63

(56) References Cited

U.S. PATENT DOCUMENTS

| | | | | |
|---|---|---|---|---|
| 219,114 A | * | 9/1879 | Ross ..................... | 137/505.18 |
| 2,402,499 A | * | 6/1946 | Lawrence .............. | 137/115.01 |
| 2,701,704 A | * | 2/1955 | Lawrence ............... | 137/551 |

* cited by examiner

Primary Examiner—Stephen M. Hepperle
(74) Attorney, Agent, or Firm—Pro-Techtor International Services

(57) ABSTRACT

A flow regulator for a water pump, comprising a valve body, a piston block, a spring, a connecting pipe, and a rod. The valve body is roughly shaped like a cross, having a passageway in a vertical direction and a first tube and a second tube in a horizontal direction. The piston block is glidingly movable in the horizontal direction in the first tube. The spring is disposed in the second tube, having ends that are fastened to inner and outer holding plates. The connecting pipe is connected with the first tube, transmitting water pressure from a supply pipe to the first tube. The rod connects the inner holding plate and the piston block to allow the water pressure and the elastic force to balance each other. The piston block is pushed inward by the water pressure, narrowing the passageway, while being pressed outward by the elastic force, so that controlled water flow and pressure in the supply pipe are achieved.

4 Claims, 4 Drawing Sheets

FLOW REGULATOR FOR WATER PUMP

BACKGROUND OF THE INVENTION

1. Field of the Invention

The present invention relates to a flow regulator for a water pump, particularly to a flow regulator for a water pump, which controls water outflow of a water pump by a differential pressure method, achieving smooth delivery of water by the water pump.

2. Description of Related Art

The water supply of modern high-rise buildings at times is not sufficient for a steady flow of water or, on the contrary, water pressure is too high, resulting in water splashing out of taps. For this reason, often water pumps are installed generating a controlled water pressure within a certain range.

Methods for regulating water pressure generated by a water pump with a motor include regulating the speed of the motor and turning the motor on and off to keep the water pressure within a pressure range.

A start-stop system for regulating water pressure mainly comprises a water pump, a pressure-sensitive switch at the outlet of the water pump, and a container. The pressure-sensitive switch detects the water pressure at the outlet of the water pump and determines the pressure range. When the water pressure falls below a lower threshold, the pressure-sensitive switch turns on the pump, increasing the water pressure in the outlet. After the water pressure has risen above an upper threshold, the pressure-sensitive switch turns off the pump. The container is installed at the outlet, storing water when the pump is turned on and releasing water when the pump is turned off. Thus the water pressure will not change rapidly, and start-stop intervals of the water pump are lengthened.

A speed-regulating system for maintaining a constant water pressure has a motor, a pressure sensor and a speed controller, which regulates the speed of the motor according to pressure values read by the pressure sensor. Thus a stable water pressure is maintained.

As compared to a speed-regulating system, a conventional start-stop system has a motor with fixed speed which is just regulated by being turned on and off. After turning on the pump, an excess outflow of water resulting in too high a pressure leads to instant turning off of the pump. Start-stop cycles of the pump easily get too short, too much energy is consumed, and the lifetime of the pump is adversely affected. Furthermore, an excess outflow of water will obstruct the pump outlet, increasing the pressure therein, as well as load on the pump and energy consumption. Therefore, a start-stop system ideally is used with pumps that deliver about as much water as is needed for the intended water supply, such that turning on the pump lets the water pressure increase only slowly and short start-stop cycles are avoided.

Since the motor of a start-stop system, when turned on, operates at a fixed speed, resulting in a constant delivered quantity of water, but demand in a large building varies with time, the pump has to be sufficiently large. Most of the time, however, demand for water is low, and a large pump is a waste of resources. In addition, pressure generated by a large pump will not be stable.

On the other hand, a speed-regulating system allows quickly to adapt the delivered water quantity to needs, avoiding the shortcoming of start-stop systems. However, the components of a speed-regulating system, a speed-regulated motor and a speed controller, are expensive and need maintenance by qualified personnel. Costs of a speed-regulated system exceed that of a start-stop system and are too large a burden for small buildings. For this reason, speed-regulated systems are generally used only in large buildings.

SUMMARY OF THE INVENTION

It is the main object of the present invention to provide a flow regulator for a water pump, which avoids too short start-stop cycles, saving energy and increasing the lifetime of the water pump.

Another object of the present invention is to provide a flow regulator for a water pump, which allows to regulate water outflow of the water pump to accommodate variations in demand of water, avoiding large mismatches of the outflow of water and demand at peak times.

The present invention can be more fully understood by reference to the following description and accompanying drawings.

DETAILED DESCRIPTION OF THE PREFERRED EMBODIMENT

Figure 1:
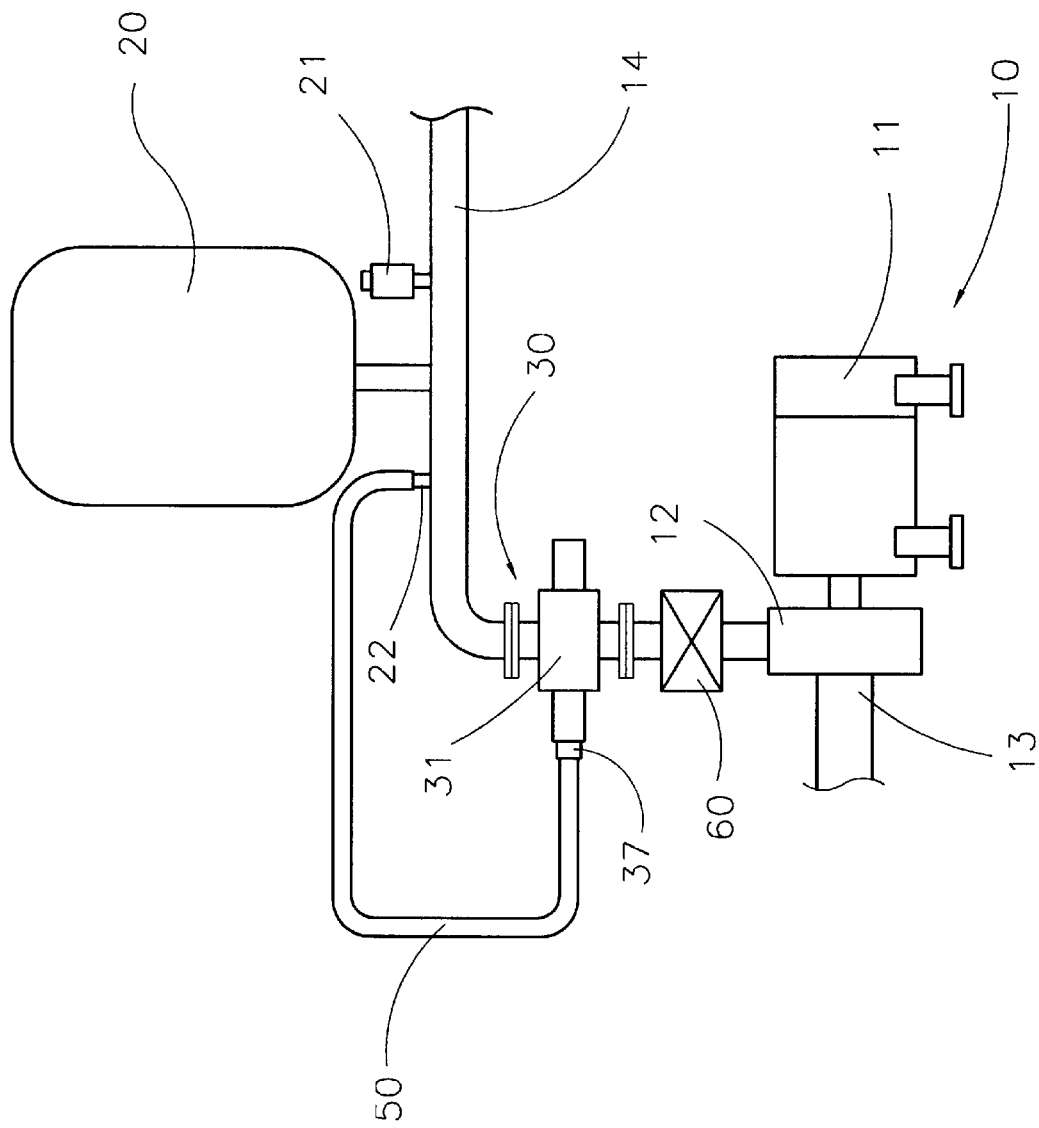
FIG. 1 is a schematic illustration of the flow regulator for a water pump of the present invention in conjunction with a water pump.

As shown in FIG. 1, the flow regulator for a water pump of the present invention is used in conjunction with a pumping system 10 which comprises: a motor 11; a pump 12, driven by the motor 11; an inlet pipe 13, connecting a water source and an inlet of the pump 12; an outlet pipe 14, beginning at an outlet of the pump 12 and delivering water from the pump 12 to supply pipes; a container 20; a pressure-sensitive switch 21; and a backflow-blocking valve 60.

The container 20 is installed at the outlet pipe 14. When the pumping system 10 is running, water enters the container 20. After stopping the motor 11, the container 20 feeds water back into the outlet pipe 14, so that upon a sudden surge of demand water pressure will not drop rapidly avoiding the need to switch on the motor after stopping the movement thereof.

The pressure-sensitive switch 21 is mounted at the outlet pipe 14, sensing water pressure in the outlet pipe 14 and switching on and off the motor 11 of the pumping system 10.

The present invention has a control valve 30 which is installed at the outlet pipe 14. Water, having left the pump 12, enters the control valve 30. As shown in FIG. 1, the control valve 30 has an entrance 37. A connecting pipe 50 connects the entrance 37 with a pressure outlet 22 on the outlet pipe 14, conducting water pressure therein to the control valve 30.

The main characteristic of the present invention is that the control valve 30 has a valve body 31 with a passageway of variable size. Thus water outflow from the pump 12 is adaptable to demand. If, for example, there is a sudden increase of demand and subsequently pressure in the outlet pipe 14 goes down, the control valve 30 is opened wider, and outflow from the pump 12 increases. If, on the other hand, demand decreases and pressure in the outlet pipe 14 builds up, the control valve is opened to a narrower degree, and outflow from the pump 12 decreases. Then pressure sensed by the pressure-sensitive valve 21 varies slowly, the motor 11 runs smoother, avoiding frequent and starts and stops. The backflow-blocking valve 60 is installed at an inlet of the control valve 30, blocking backflow of water from the outlet pipe 14.

Figure 2:
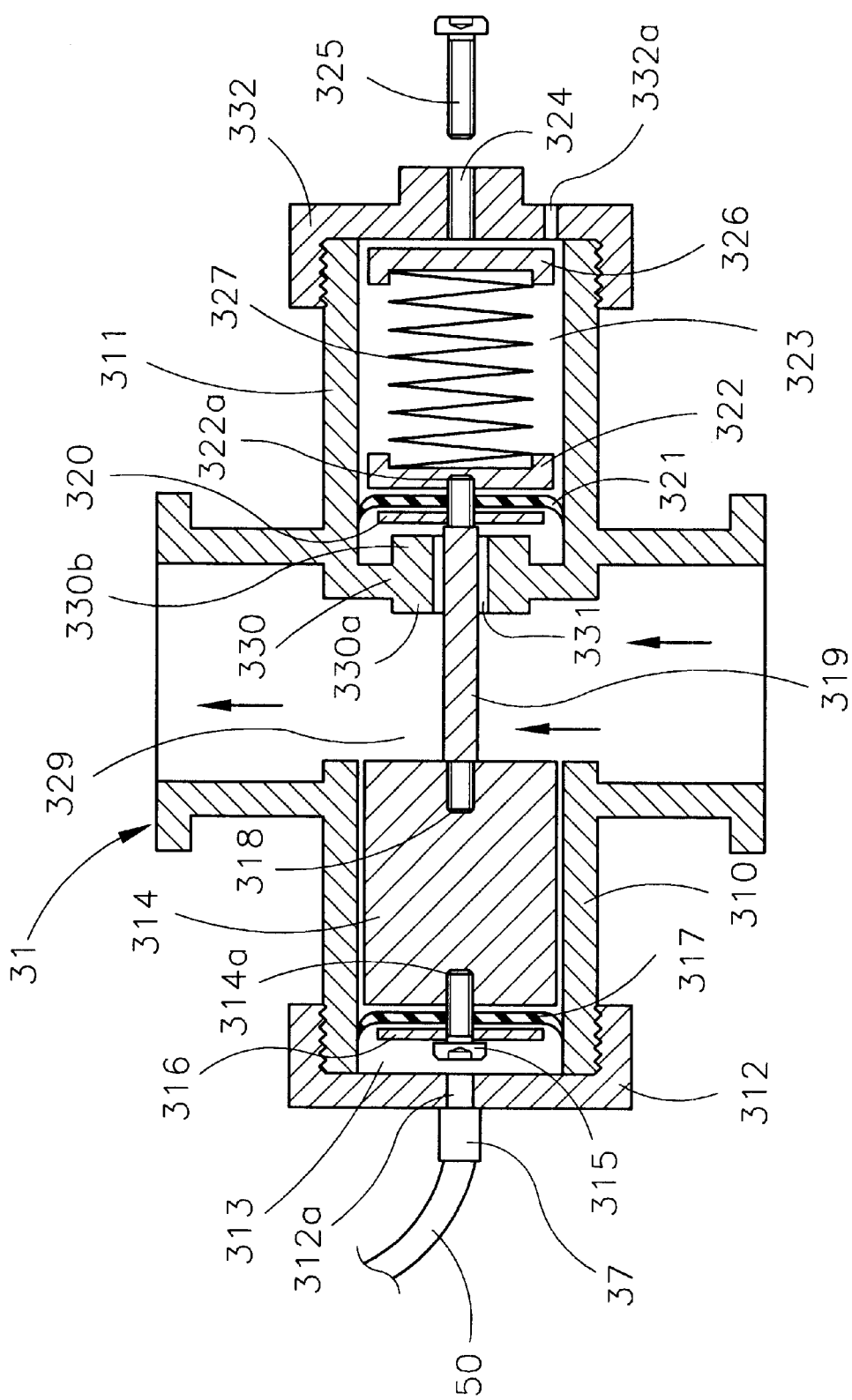
FIG. 2 is a sectional view of the control valve of the present invention.

Referring to FIG. 2, the valve body 31 is roughly shaped like a cross. A passageway 329 passes through in a vertical direction, having an upper end connected with the outlet pipe 14 and a lower end connected with the outlet of the pump 12. In a horizontal direction, the valve body 31 has on a left side a first tube 310 and on a right side a second tube 311. The first tube 310 is terminated by a first cap 312, enclosing a first chamber 313. Inside the first chamber 313, a piston block 314 is disposed, having an outer end into which a threaded hole 314a is cut. The threaded hole 314a takes in a screw 315, which in addition carries a washer 316 and a sealing ring 317. The piston block 314 is able to glide smoothly in the first chamber 313 and prevents pressure from escaping. A circular hole 312a is cut in the first cap 312 at a center thereof. The connecting pipe 50 is set on the circular hole 312a for leading water pressure from the outlet pipe 14 into the first chamber 313, acting on the piston block 314. The piston block 314 furthermore has an inner end with a threaded hole 318, into which a rod 319 is screwed. Thus water pressure in the first chamber 313 is transmitted to the second tube 311.

The second tube 311 encloses a second chamber 323. The rod 319 reaches into the second chamber 323 of the second tube 311, having an end that carries a terminating plate 320 and a sealing ring 321 and which is screwed into a inner holding plate 322 in a threaded hole 322a thereof. A second cap 332 is set on the second tube 311 on a far end thereof. An inner terminating plate 330 closes the second tube 311 on a near end thereof. The inner terminating plate 330 has an inner side with an inner shoulder 330a and an outer side with an outer shoulder 330b. At a central position, a gliding opening 331 is cut through the inner terminating plate 330, allowing the rod 319 to pass through. The gliding opening 331 has a diameter that is larger than the diameter of the rod 319. Thus water pressure from the passageway 329 is led into an inner part of the second chamber 323. When water pressure builds up in the passageway 329, the inner end of the piston block 314 and the inner holding plate 322 exert equal forces on each other and therefore will not move. The outer end of the piston block 314 is exposed to water pressure, and the inner holding plate 322 is on an outer side exposed to an elastic force of a spring 327. The piston block 314 shifts to balance these forces.

Figure 4:
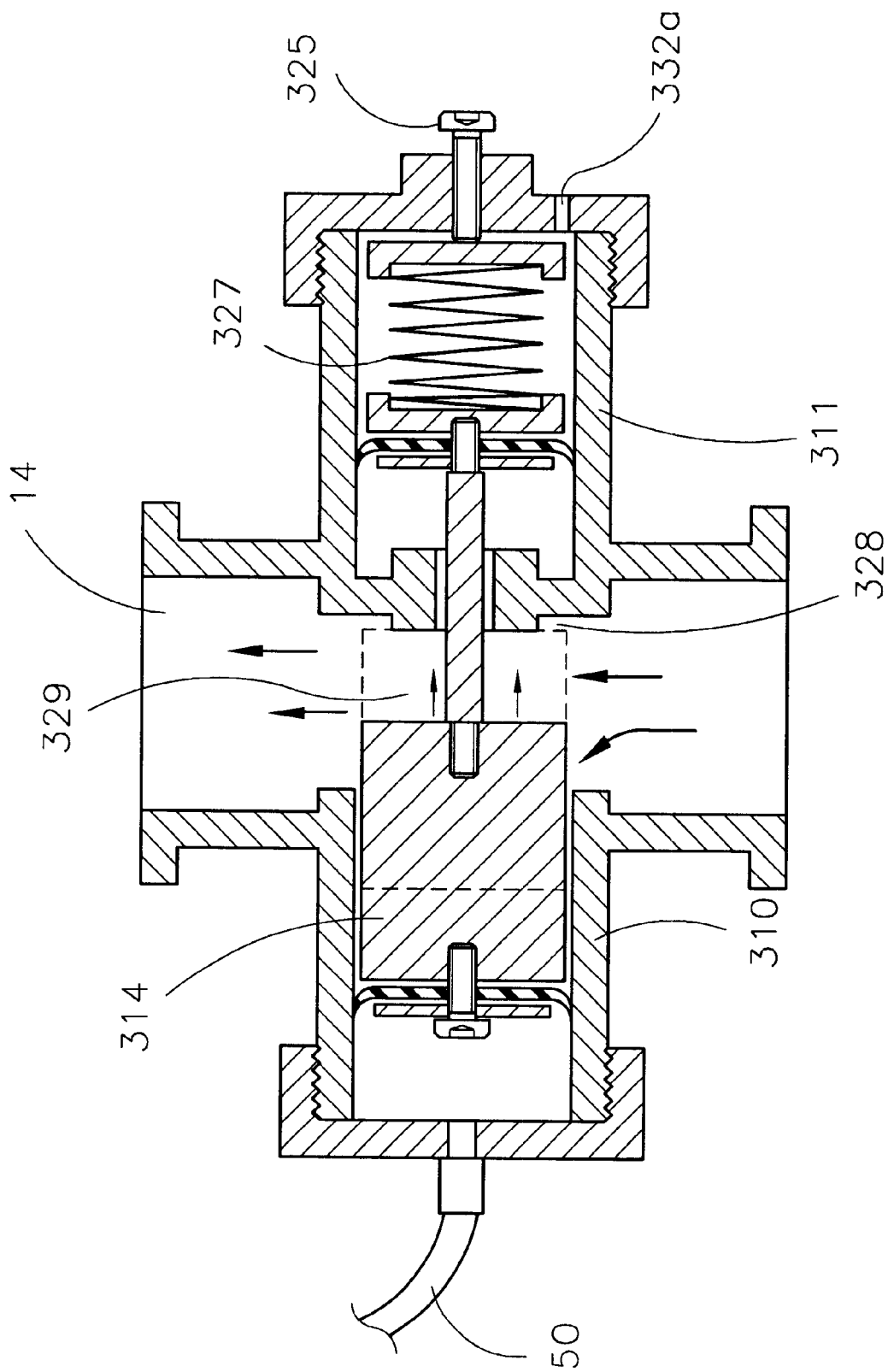
FIG. 4 is a schematic illustration of the movement of the present invention at another stage.

The inner shoulder 330a on the inner terminating plate 330 is contacted by the inner end of the piston block 314 at a closing position thereof, when the piston block 314 is driven there by water pressure from the connecting pipe 50. Then a gap 328 is left between the piston block 314 and the inner terminating plate 330, as shown in FIG. 4. This allows a minimum flow of water through the passageway 329, so that the pressure-sensitive switch 21 senses a minimum water pressure due to water flow, preventing unnecessary switching off of the motor 11. The inner shoulder 330a on the inner terminating plate 330 extends into the passageway 329, limiting the movement of the piston block 314 into the passageway 329. The outer shoulder 330b of the inner terminating plate 330 ensures a minimum distance of the sealing ring 321 on the holding plate 322 from the inner terminating plate 330, preventing pressing the sealing ring 321 on the inner terminating plate 330 and damaging thereof.

A vent hole 332a is bored through the second cap 332, ensuring that pressure in the second chamber 323 is equal to atmospheric pressure for a smooth movement of the inner holding plate 322 within the second chamber 323, following the movement of the piston element 314.

Furthermore, a threaded hole 324 is bored through the second cap 332. An adjusting screw is put through the threaded hole 324. If the control valve 30 is installed at a different pump and water pressure in the outlet pipe 14 exceeds a preset range, the adjusting screw 325 is turned, shifting an outer holding plate 326. The outer holding plate 326 holds the spring 327 at an outer end thereof. Turning the adjusting screw 325 thus changes the elastic force of the spring 327 and consequently the force of the rod 319 acting on the piston block 314, which pushes the piston block 314 towards an opening position. Water pressure from the connecting pipe 50 acts as a counterforce with the effect that the piston block 314 takes on a balanced position, allowing a certain flow of water.

When water pressure in the outlet pipe 14 changes, the balanced position of the piston block 314 within the passageway 329 changes accordingly, regulating water flow through the control valve 30 according to demand. Thus pressure of outflowing water in the outlet pipe 14 does not exceed a certain range, therefore sudden pressure variations in the outlet pipe 14 and frequent switching on and off of the motor 11 are prevented.

Figure 3:
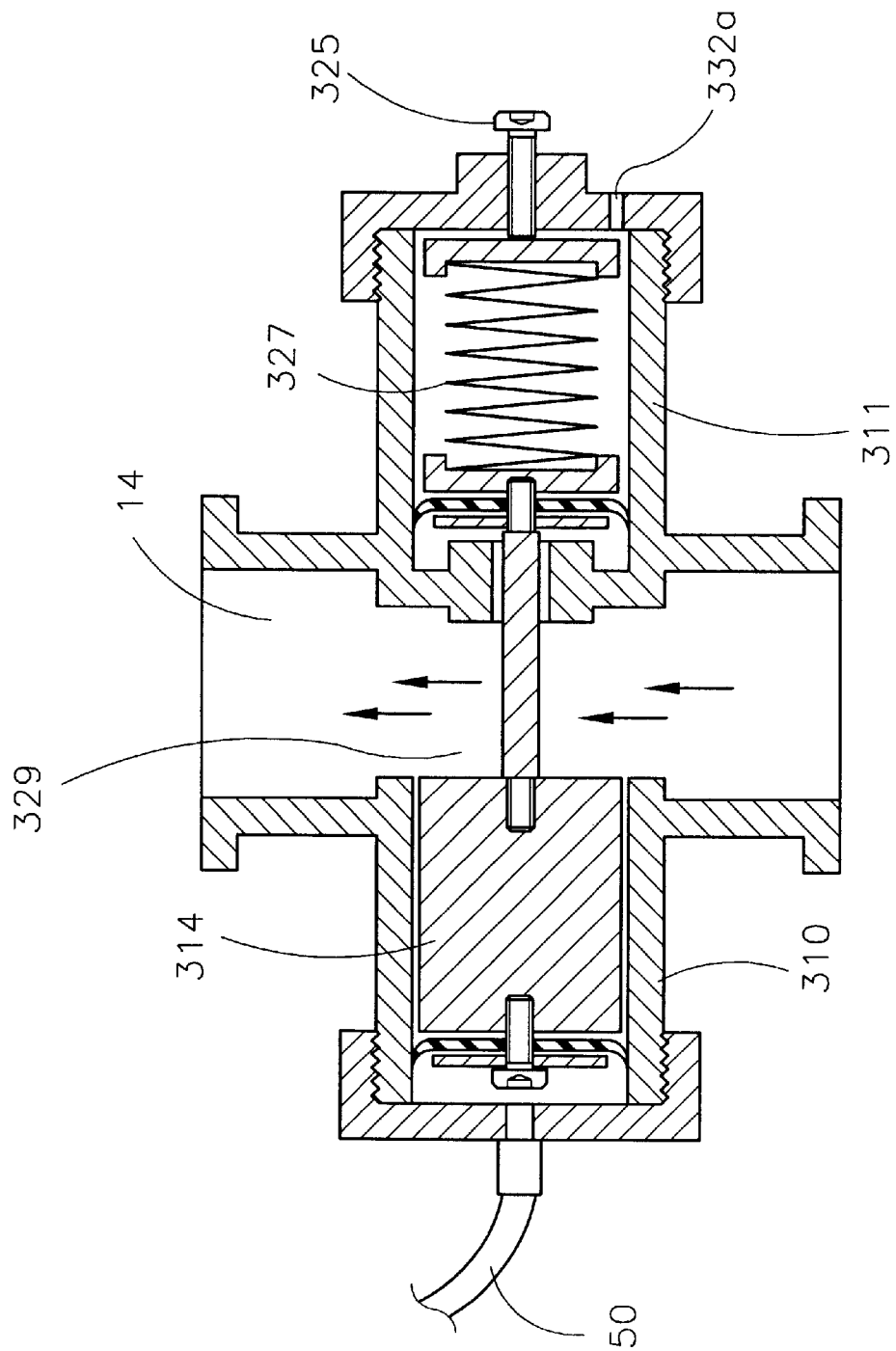
FIG. 3 is a schematic illustration of the movement of the present invention.

The balanced position of the piston block 314 results from balancing forces due to water pressure from the connecting pipe 50 and the elastic force of the spring 327. Referring to FIG. 3, when water pressure in the output pipe 14 drops, water pressure transmitted by the connecting pipe 50 decreases, as well, exerting reduced force on the piston element 314, leaving the elastic force of the spring 327 comparatively large, so that the piston element 314 is pushed outward. Thus the passageway 329 is opened farther, and water outflow from the pump 12 as well as water flow in the outlet pipe 14 increase.

Referring to FIG. 4, when water pressure in the output pipe 14 increases, water pressure transmitted by the connecting pipe 50 increases, as well, exerting a higher force on the piston element 314, so that the piston element 314 is pushed inward. Thus the passageway 329 is opened to a lesser degree, and water outflow from the pump 12 as well as water flow in the outlet pipe 14 decrease. As the above explanation shows, the control valve 30 of the present invention effectively regulates water outflow from the pump 12 according to demand at the outlet pipe 14, avoiding frequent switching on and off of the motor 11 due to rapid changes in demand, thus minimizing wear of the motor 11. To install the control valve 30 at a pump with different pressure range, the adjusting screw 325 is accordingly set, changing the elastic behavior of the spring 327 for adapting to a different water pressure in the outlet. By finding optimum switching intervals of the motor 11, the lifetime thereof is extended.

While the invention has been described with reference to a preferred embodiment thereof, it is to be understood that modifications or variations may be easily made without departing from the spirit of this invention which is defined by the appended claims.

What is claimed is:

1. A flow regulator for a water pump, comprising:

a valve body having a passageway oriented in a first direction and a first tube and a second tube oriented perpendicular to said passageway;

a cylindrical piston block glidingly movable in said first tube;

a spring disposed in said second tube, said spring having an inner end fastened to an inner holding plate and an outer end fastened to an outer holding plate, said spring having an elastic force that urges said piston block towards an original position;

a connecting pipe connected to said first tube, said connecting pipe transmitting water pressure from a supply pipe to said first tube; and a rod connecting said inner holding plate and said piston block to allow said water pressure and said elastic force of said spring to balance each other;

wherein said second tube at an inner end has an inner terminating plate with an inner shoulder, said inner shoulder ensuring that when said inner shoulder is touched by said piston block, a gap is left between said terminating plate and said inner terminating plate, such that said piston block is pushed inward by said water pressure, narrowing said passageway, while being urged by said elastic force towards said original position, so that controlled water flow and pressure in said supply pipe are achieved.

2. A flow regulator for a water pump according to claim 1, wherein:

a cap with a threaded hole at a central position is set on said second tube, said cap including an adjusting screw passing through said threaded hole to regulate a distance between said inner and outer holding plates, said adjusting screw varying said elastic force of said spring.

3. A flow regulator for a water pump according to claim 1, wherein:

said rod is attached to said inner holding plate and to an inner end of said piston block, said rod transmitting said elastic force, as adjusted by said adjusting screw, to said piston block, so as to regulate extension of said piston block into said passageway.

4. A flow regulator for a water pump according to claim 1, wherein:

a cap with a threaded hole at a central position is set on said second tube, said cap having a vent hole.

* * * * *